United States Patent
Ho et al.

(10) Patent No.: US 8,847,906 B2
(45) Date of Patent: Sep. 30, 2014

(54) TOUCH DEVICE AND METHOD FOR MANUFACTURING THE SAME

(75) Inventors: Kwan-Sin Ho, Miaoli (TW); Shousheng Yu, Longyan (CN); Maolin Liao, Zhangzhou (CN); Hao Zhang, Yongshun (CN)

(73) Assignee: TPK Touch Solutions (Xiamen) Inc., Xiamen (CN)

( * ) Notice: Subject to any disclaimer, the term of this patent is extended or adjusted under 35 U.S.C. 154(b) by 225 days.

(21) Appl. No.: 13/585,813

(22) Filed: Aug. 14, 2012

(65) Prior Publication Data

US 2013/0168220 A1 Jul. 4, 2013

(30) Foreign Application Priority Data

Dec. 29, 2011 (CN) .......................... 2011 1 0459049

(51) Int. Cl.
*G06F 3/041* (2006.01)

(52) U.S. Cl.
USPC ........................................................ 345/173

(58) Field of Classification Search
USPC .................................................. 345/173–178
See application file for complete search history.

(56) References Cited

FOREIGN PATENT DOCUMENTS

| CN | 101989160 A | 3/2011 |
|----|-------------|--------|
| TW | M388684 | 9/2010 |

*Primary Examiner* — Jeremy C Norris
(74) *Attorney, Agent, or Firm* — Gokalp Bayramoglu

(57) ABSTRACT

A touch device is provided in the present disclosure, wherein the touch device comprises: a protection cover having a sensing area and a peripheral area surrounding the sensing area; a first mask layer disposed in the peripheral area surrounding the sensing area; a second mask layer disposed in the peripheral area surrounding the first mask layer, wherein the area of the second mask layer is bigger than that of the first mask layer; and a sensing electrode layer having a sensing portion located in the sensing area and an extension portion extending from the sensing area to the peripheral area, wherein the extension portion is disposed on the first mask layer. Moreover, a method for manufacturing the touch device described above is also provided in the present disclosure.

19 Claims, 3 Drawing Sheets

TOUCH DEVICE AND METHOD FOR MANUFACTURING THE SAME

This application claims the benefit of Chinese application No. 201110459049.X, filed on Dec. 29, 2011.

BACKGROUND

1. Technical Field

The present disclosure relates to a touch technology. More particularly, the present disclosure relates to a touch device and a method for manufacturing the same.

2. Description of the Related Art

Touch panels have been widely used in home appliances, communication devices, and electronic information devices. Touch panel can be integrated with, a display panel to form a touch, display panel that allows a user to choose an image displayed on the panel directly by a finger or a stylus. Due to the convenience accorded to users, touch display panels are gradually replace physical keyboards as an input interface for various electronic products and providing an efficient operation system.

A sensing electrode layer of a touch panel is usually disposed in a sensing area of the touch panel, wherein a mask layer is disposed at periphery of the sensing area, and wherein various circuits, such as signal wires that transmit signals of the sensing electrode layer, are disposed on the mask layer. In a practical production process, a mask layer is usually formed on a substrate of a touch panel prior to a sensing electrode layer, and then a sensing electrode layer is formed by sputtering, etching and high-temperature baking. However, in the process of high-temperature baking, impurities such as $CO_2$, CO, and $H_2O$ can easily volatilize from the mask layer and infiltrate into the metal oxide that forms the sensing electrode layer, leading to change in conductive performance and affecting the sensing sensitivity, which is unfavorable for accuracy of the subsequent touch detection. Therefore, impurities generated by the mask layer should be reduced as much as possible to stabilize performance of the sensing electrode layer.

SUMMARY OF THE INVENTION

According to an embodiment of the present disclosure, a touch device and method for manufacturing the same is provided, wherein a mask layer is formed with small and bigger portions in a peripheral area and the sensing electrode layer is formed between the steps of forming the two portions of the mask layer, thereby reducing the sensing electrode layer is affected by the bigger portion the mask layer for solving the problem that conductive performance of a sensing electrode layer of a touch panel is unstable due to the influence of impurities of a mask layer.

According to an embodiment of the present disclosure, the touch device comprises: a protection cover having a sensing area and a peripheral area surrounding the sensing area; a first mask layer disposed in the peripheral area surrounding the sensing area; a second mask layer disposed in the peripheral area surrounding the first mask layer, wherein the area of the second mask layer is bigger than that of the first mask layer; and a sensing electrode layer having a sensing portion located in the sensing area and an extension portion extending from the sensing area to the peripheral area, wherein the extension portion is disposed on the first mask layer.

According to another embodiment of the present disclosure a method for manufacturing a touch device is provided, wherein the touch device comprises a protection cover having a sensing area and a peripheral area surrounding the sensing area, the method comprising: forming a first mask layer in the peripheral area surrounding the sensing area; forming a sensing electrode layer after the step of forming the first mask layer, wherein the sensing electrode layer comprises a sensing portion formed in the sensing area and an extension portion extending from the sensing area to the peripheral area, wherein the extension portion is disposed on the first mask layer; and forming a second mask layer surrounding the first mask layer after the step of forming the sensing electrode layer, wherein the area of the second mask layer is bigger than that of the first mask layer.

For forming the first mask layer and the second mask layer in the mask portion of the peripheral area in two steps impurities generated by the mask layers are reduced, thereby stabilizing performance of the sensing electrode layer.

BRIEF DESCRIPTION OF THE DRAWINGS

For those skilled in the art to understand the present disclosure, numerous embodiments are described below, annexing drawings to minutely illustrate the matters of the disclosure and the purpose thereof.

DETAILED DESCRIPTION OF THE EMBODIMENTS

Figure 1:
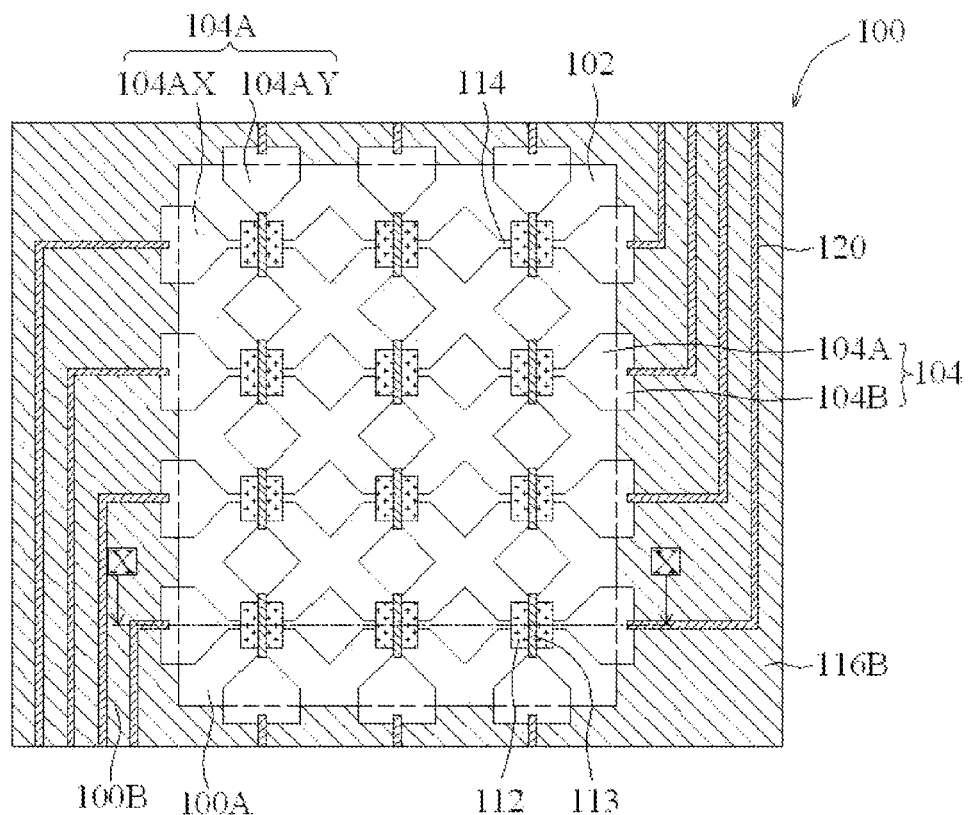
FIG. 1 is top view of a touch device in accordance with an embodiment of the present disclosure.
Figure 2:
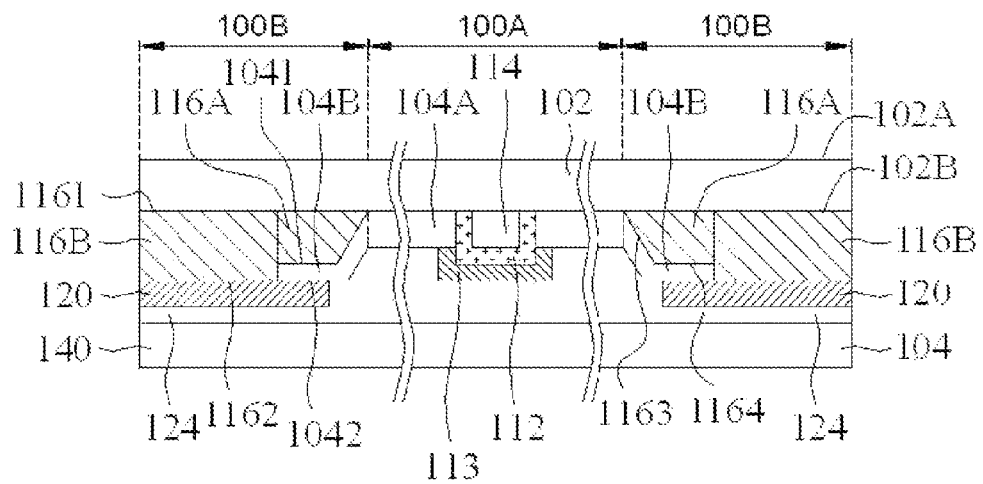
FIG. 2 is schematic sectional view of the touch device sectioned along a section line X-X' shown in FIG. 1.

Referring, to FIG. 1 and FIG. 2, FIG. 1 is a top view of a touch device in accordance with an embodiment of the present disclosure and FIG. 2 is a schematic sectional view of the touch device along a sectional line X-X' shown in FIG. 1. A touch device 100, comprises a protection cover 102 having a sensing area 100A and a peripheral area 100B surrounding the sensing area 100A, a sensing, electrode layer 104, a first mask layer 116A, and a second mask layer 116B.

The protection cover 102 may provide a protection function for the elements disposed below the protection cover 10, such as the sensing electrode layer 104, the first mask layer 116A, and the second mask layer 116B, etc., and also may provide a supporting function to bear those elements. The protection cover 102 may be a transparent substrate made by glass or plastic material. The protection cover 102 has a first surface 102A and a second surface 102B, wherein the first surface 102A of the protection cover 102 is used as a touch surface of the touch device 100 and the second surface 102B of the protection cover 102 bears the disposition of the sensing electrode layer 104, the first mask layer 116A, and the second mask layer 116B, etc.

The touch device 100, for example, can be a capacitive touch device. The sensing electrode layer 104 comprises a sensing portion 104A and an extension portion 104B. The sensing portion 104A is disposed in the sensing area 100A of the touch device 100. The extension portion 104B extends from the sensing portion 104A to the peripheral area 100B and is disposed on the first mask layer 116A. The sensing electrode layer 104 comprises a plurality of first sensing electrodes 104AX arranged in rows and a plurality of second sensing electrodes 104AY arranged in columns. Two adjacent first sensing electrodes 104AX arranged in rows are mutually connected via a connection line 114 while the second sensing, electrodes 104AY arranged in columns are separated from each other and the adjacent two second sensing electrodes 104AY in a same column are electrically connected by a jumper 120. An insulation layer 112 is disposed between the connection line 114 and the jumper 120 such that the first sensing electrode 104AX is electrically insulated from the second sensing electrode 104AY. Thus, the arrangement shown in FIG. 1 is formed, but pattern of the sensing electrode layer is not limited thereto. Pattern of the sensing electrode layer can be single-layer and single-axis or double-layer and double-axis. Various modifications and substitutions may be made thereto without departing from the spirit and scope of the present disclosure.

When an operator touches the sensing area 100A of the first surface 102A of the protection cover 102 by a finger or a stylus, a sensing capacitance is generated between the finger or the stylus and the sensing portion 104A of the sensing electrode layer 104. The sensing capacitance is transformed into an electrical signal and then transmitted to an external circuit for further calculating touch positions.

The first mask layer 116A and the second mask layer 116B are disposed in the peripheral area 100B of the touch device 100. The first mask layer 116A surrounds the sensing portion 104A in the sensing area 100A and is located between the protection cover 102 and the extension portion 104B of the sensing electrode layer 104. The second mask layer 116B surrounds the first mask layer 116A and covers the remaining peripheral area 100B that is not covered by the first mask layer 116A. The area of the second mask layer 116B is bigger than that of the first mask layer 116A. Therefore the first mask layer 116A can be made much smaller, compared with the touch device with one big mask layer formed in one manufacturing process, and the impurities such as $CO_2$, CO and $H_2O$ generated from the first mask layer 116A can be reduced during the process of manufacturing the sensing electrode layer 104. In a preferred embodiment, size of the first mask layer 116A is designed to cover 0.1%-5% of the area of the protection cover 102 such that impurities such as $CO_2$, CO and $H_2O$ generated from the first mask layer 116A while forming the sensing electrode layer 104 are reduced, thereby ensuring sensing capability of the sensing electrode layer 104.

The first sensing electrodes 104AX and the second sensing electrodes 104AY can further extend to the first mask layer 116A to form an extension portion 104B of the sensing electrode layer 104. The area of the first mask layer 116A can be larger than or equal that of the extension portion 104B of the sensing electrode layer 104. In one preferable embodiment, the scope of the surface of the extension portion 104B of the sensing electrode layer 104 just covers that the surface of the first mask layer 116A, so patterns of the extension portion 104B of the sensing electrode layer and the first mask layer 116A can be substantially same. For example, if the extension portion 104B comprises a plurality of separated rectangles, semicircles, triangles or any other polygons, the first mask layer 116A can also comprise a plurality of separated rectangles, semicircles, triangles or any other polygons, but it is not limited thereto. Pattern of the first mask layer 116A can be different from that of the extension portion 104B of the sensing electrode layer. For example, the first mask layer 116A can be a frame shape surrounding the sensing area 100A. While the extension portion 104B can comprise a plurality of separated rectangles, semicircles, triangles or any other polygons covering the first mask layer 116A.

More specifically, the extension portion 104B of the sensing electrode layer 104 extends from the edge of the sensing area 100A to the first mask layer 116A. The first mask layer 104 has a slant surface 1163 and a flat surface 1164 abutting on the slant surface 1163, and the extension portion 104B of the sensing electrode layer 104 is formed along the slant surface 1163 to the flat surface 1164 of the first mask layer 116A. The slant degree of the first mask layer 116A is, for example, about 20 degrees to 40 degrees, thereby preventing the extension portion 104B from breaking. In an embodiment, end of the extension portion 104B of the sensing electrode layer 104 can directly contact with a side wall of the second mask layer 116B. Besides, total thickness of the first mask layer 116A and the extension portion 104B of the sensing electrode layer 104 can be substantially equivalent to thickness of the second mask layer 116B. More specifically, the second mask layer 116B has a top surface 1161 and a bottom surface 1162, the extension portion 104B of the sensing electrode layer 104 has a top surface 1041 facing to the first mask layer 116A and a bottom surface 1042. The bottom surface 1042 is substantially flush with the bottom surface 1162 of the second mask layer 116B. The first mask layer 116A and the second mask layer 116B can be made of a same material such as of colored photoresist or printing ink. Moreover, there are no openings in the first mask layer 116A, in the second mask layer 116B, or between the first mask layer 116A and the second mask layer 116B such that mask effects of all areas in the peripheral area 100B are the same. Thus, even if the visible area includes the peripheral area 100B when a user operates the touch device 100, all areas in the peripheral, area 100B have no color difference.

In an embodiment, a touch device 100 further comprises a signal transmitting wire 120 formed on a second mask layer 116B and on an extension portion 104B of a sensing electrode layer 104 thereby electrically connecting the extension portion 104B of the sensing electrode layer 104 and an external circuit (not shown) and transmitting a capacitance change sensed by a sensing portion 104A of the sensing electrode layer 104 to a signal processor (not shown) of the touch device 100 for computing a touch signal. Since the bottom surface 1042 is substantially flush with the bottom surface 1162 of the second mask layer 116B, the signal transmitting, wire 120 is flat, thereby ensuring, resistance of the signal transmitting wire 120 in a steady state and avoiding resistance fluctuation due to bending of the circuit.

In an embodiment, a protection layer 124 fully covers all the elements (such as a sensing portion 104A and an extension portion 104B of a sensing electrode layer 104, a first mask layer 116A and a second mask layer 116B) disposed on a second surface 102B of a protection cover 102 to protect these elements and provide a flat surface for attaching a display panel 140.

FIG. 3A~FIG. 3E are schematic sectional views of a touch device during an intermediate manufacturing process in accordance with an embodiment of the present disclosure.

Figure 3A:
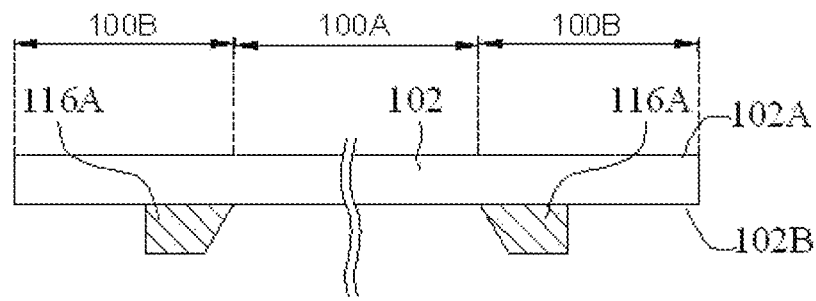
FIG. 3A~FIG. 3E are schematic sectional views of a touch device during intermediate manufacturing process in accordance with an embodiment of the present disclosure.

Firstly, as shown in FIG. 3A a protection cover 102 is provided and divided into a sensing area and a peripheral area surrounding the sensing area. The protection cover 102 has a first surface 102A and a second surface 102B opposite to the first surface 102A, wherein the first surface 102A is used as a touch surface. A first mask layer 116A is formed on the second surface 102B within a peripheral area 100B of the protection cover 102. The first mask layer 116A can be made of colored photoresist, printing ink or other non-transparent materials, and can be formed by many modes, for example, formed by a deposition process and then patterned by a photolithographic process, or formed by printing process. Other features of the first mask layer 116A have been described in above embodiments, so the description is not made again herein.

Figure 3B:
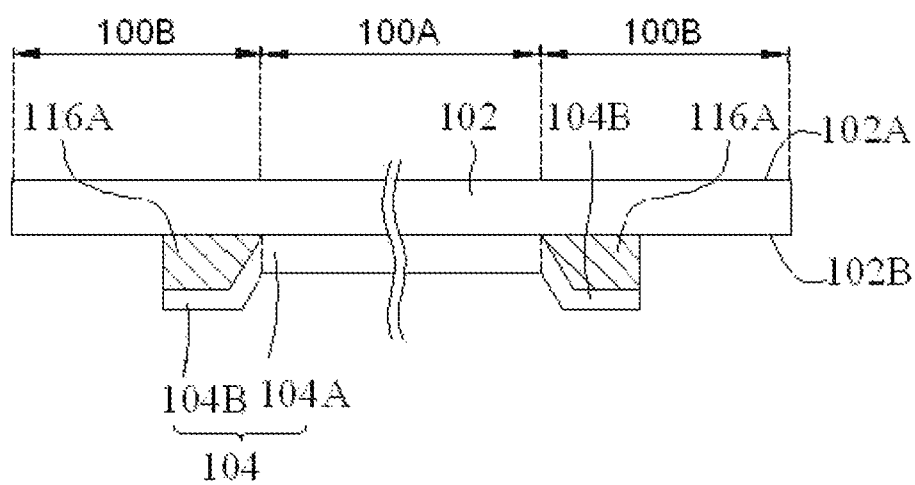

Next, as shown in FIG. 3B, a sensing electrode layer 104 is formed on the second surface 102B of the protection cover 102 and on the first mask layer 116A. The sensing electrode layer comprises a sensing portion 104A and an extension portion 104B. A sensing portion 104A of the sensing electrode layer 104 located in a sensing area 100A can be patterned into first sensing electrodes 104AX arranged in rows and second sensing electrodes 104AY arranged in columns as shown in FIG. 1 by a photoetching process or a printing process. The extension portion 104B extends from the sensing area 100A to the peripheral area 100B, and is disposed on the first mask layer 116A. More specifically, as shown in FIG. 1, two adjacent first sensing electrodes 104AX are mutually connected via a connection line 114 and the second sensing electrodes 104AY are separated from each other, and other features of the sensing electrode layer 104 have been described in above embodiments, so the description is not made again herein.

Figure 3C:
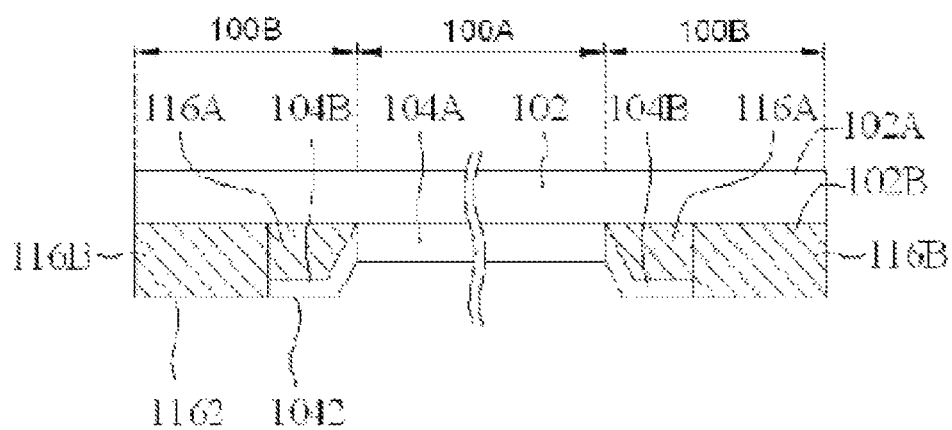

Then, as shown in FIG. 3C, after the sensing elements in the sensing area 100A are all formed, a second mask layer 116B is formed in the remaining portion of the peripheral area 100B that is not covered by the first mask layer 116A, and the area of the second mask layer 116B is bigger than that of the first mask layer 116A. The second mask layer 116B and the first mask layer 116A can be formed by same technique and material. In an embodiment, the second mask layer 116B is thicker than the first mask layer 116A. Excessive part of the second mask layer 116B can be removed by a planarization process, such as chemical mechanical polishing, until its bottom surface 1162 is substantially flush with bottom surface 1042 of an extension portion of the sensing electrode layer.

Figure 3D:
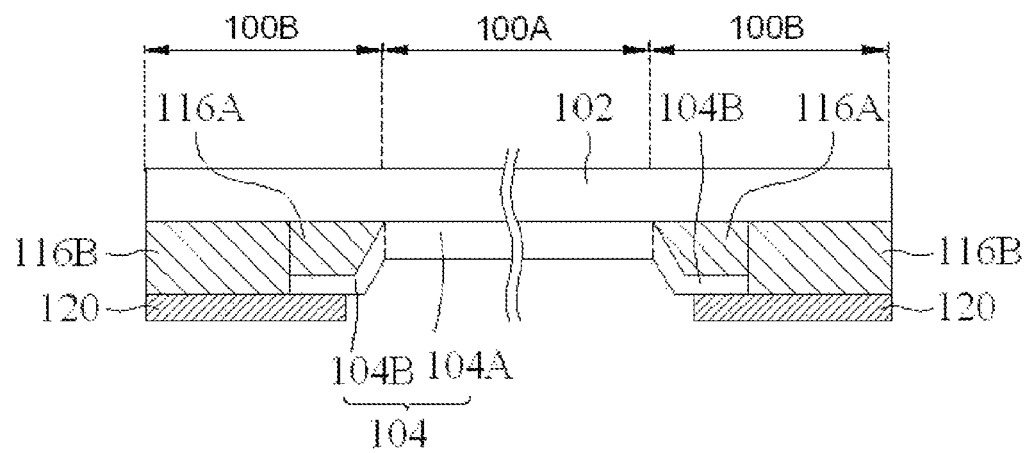

Then, referring to FIG. 3D, a signal transmitting wire 120 is formed on the second mask layer 116B and on the extension portion 104B of the sensing electrode layer 104 for electrically connecting the extension portion 104B of the sensing electrode layer 104 and an external circuit (not shown) and transmitting a capacitance change sensed by a sensing portion 104A of the sensing electrode layer 104 to a signal processor (not shown) of the touch device 100 for computing a touch signal. The signal transmitting wire 120 can be made of a metal material and patterned by a photolithographic process or a printing process.

Furthermore, an insulation layer 112 shown in FIGS. 1 and 2 is formed on the connection line 114 for electrically insulating the corresponding first sensing electrode 104AX and the second sensing electrode 104AY after the forming step of the sensing electrode layer 104, the second mask layer 116B or the signal transmitting wire 120. As to simplify the figure, the insulation layer 112 here is not shown in FIG. 3B, FIG. 3C or FIG. 3D.

Moreover; a jumper 120 shown in FIGS. 1 and 2 may be formed on, the insulation layer 112 for electrically connecting correspondingly two adjacent second sensing electrodes 104AY after the insulation layer 112 is formed, in one embodiment, the jumper 120 and the signal transmitting wire 120 can be formed at the same manufacturing process. As to simplify the figure, the jumper 120 here is not shown in FIG. 3D.

Thus, the arrangement shown in FIG. 1 is formed by the steps shown in FIGS. 3A~3D, but pattern of the sensing electrode layer 104 is not limited thereto, the insulation layer 112, the jumper 120 are also unnecessary to be designed for the pattern of the sensing electrode layer 104 accordingly. Pattern of the sensing electrode layer can be single-layer and single-axis or double-layer and double-axis. Various modifications and substitutions may be made thereto without departing from the spirit and scope of the present disclosure.

Figure 3E:
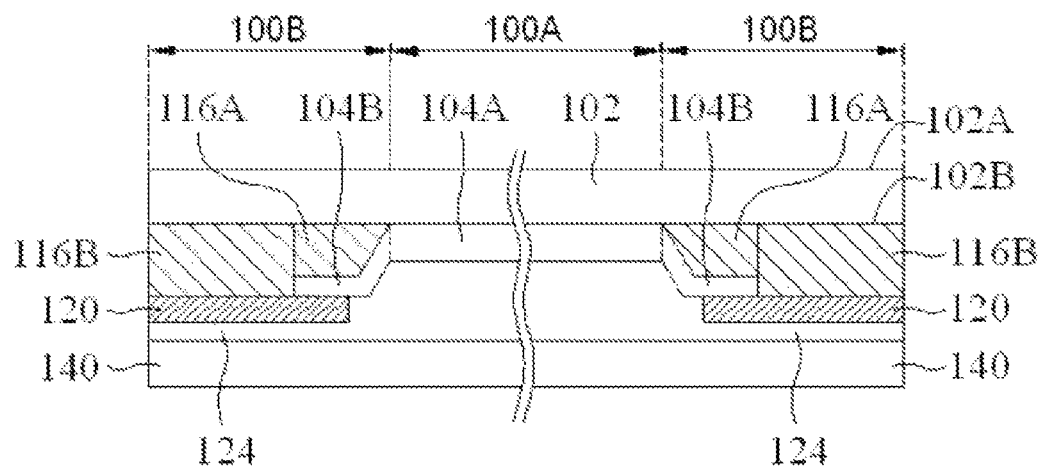

Finally, referring to FIG. 3E, a protection layer 124 is formed to cover all the elements (including the sensing portion 104A and the extension portion 104B of the sensing electrode layer 104, the first mask layer 116A, and the second mask layer 116B) on the second surface 102B and provide a substantially flat surface. Thus, manufacturing of a touch panel is completed. Subsequently, a display panel 140 is attached on the protection layer 124, thereby forming the touch device 100 provided in the embodiments of the present disclosure.

While certain embodiments have been shown and described, various modifications and substitutions may be made thereto without departing from the spirit and scope of the disclosure. Therefore, it is to be understood that the present disclosure has been described by way of illustration and not limitations.

What is claimed is:

1. A touch device comprising:
    a protection cover having a sensing area and a peripheral area surrounding the sensing area;
    a first, mask layer disposed in the peripheral area surrounding the sensing area;
    a second mask layer disposed in the peripheral area surrounding the first mask layer, wherein the area of the second mask layer is bigger than that of the first mask layer; and
    a sensing electrode layer having a sensing portion located in the sensing area and an extension portion extending from the sensing area to the peripheral area, wherein the extension portion is disposed on the first mask layer.

2. The touch device as claimed in claim 1, wherein the touch device further comprises a signal transmitting wire formed on the extension portion of the sensing electrode layer and on the second mask layer for electrically connecting the extension portion of the sensing electrode layer.

3. The touch device as claimed in claim 1, wherein the first flask layer covers 0.1%-5% of the total area of the protection cover.

4. The touch device as claimed in claim 1, wherein the scope of the surface of the first mask layer just covers the surface of the extension portion of the sensing electrode layer.

5. The touch device as claimed in claim 1, wherein the second mask layer has a top surface and a bottom surface, the extension portion of the sensing electrode layer has as top surface facing, to the first mask layer and a bottom surface being substantially flush with the bottom surface of the second mask layer.

6. The touch device as claimed in claim 1, wherein the first mask layer has a slant surface and a flat surface abutting on the slant surface, and the extension portion of the sensing electrode layer is formed along the slant surface to the flat surface of the first mask layer.

7. The touch device as claimed in claim 1, wherein the sensing portion of the sensing electrode layer comprises a plurality of first sensing electrodes arranged in rows and a plurality of second sensing electrodes arranged in columns, wherein two adjacent first sensing electrodes are mutually connected via a connection line and the second sensing electrodes are separated from each other.

8. The touch device as claimed in claim 7, further comprising:
    a jumper electrically connecting correspondingly two adjacent second sensing electrodes; and
    an insulation layer disposed between the connection line and the jumper for electrically insulating the corresponding first sensing electrode and the second sensing electrode.

9. The touch device as claimed in claim 1, wherein the first mask layer and the second mask layer are made of colored photoresist or ink.

10. A method for manufacturing a touch device, comprising:
- forming a first mask layer in a peripheral area of a protection cover, wherein the peripheral area surrounds a sensing area of the protection cover;
- forming a sensing electrode layer after the step of forming the first mask layer, wherein the sensing electrode layer comprises a sensing portion formed in the sensing area and an extension portion extending from the sensing area to the peripheral area wherein the extension portion is disposed on the first mask layer; and
- forming a second mask layer surrounding the first mask layer after the step of forming the sensing electrode layer; wherein the area of the second mask layer is bigger than that of the first mask layer.

11. The method for manufacturing the touch device as claimed in claim 10, further comprising forming a signal transmitting wire on the second mask layer and on the extension portion of the sensing electrode layer, wherein the signal transmitting wire electrically connects the extension portion of the sensing electrode layer.

12. The method for manufacturing the touch device as claimed in claim 10, wherein the first mask layer covers 0.1%-5% of the total area of the protection cover.

13. The method for manufacturing the touch device as claimed in claim 10, wherein the method for forming the first mask layer and the second mask layer comprises the step of printing or photoetching.

14. The method for manufacturing the touch device as claimed in claim 10, wherein the method for forming the sensing electrode layer comprises the step of photoetching or printing.

15. The method for manufacturing the touch device as claimed in claim 10, wherein the second mask layer has a to surface and a bottom surface, the extension portion of the sensing electrode layer has a top surface facing to the first mask layer and a bottom surface being substantially flush with the bottom surface of the second mask layer.

16. The method for manufacturing the touch device as claimed in claim 10, wherein the first mask layer has a slant surface and a flat surface abutting on the slant surface, and the extension portion of the sensing electrode layer is formed along the slant surface to the flat surface of the first mask layer.

17. The method for manufacturing the touch device as claimed in claim 10, wherein the sensing portion of the sensing electrode layer comprises a plurality of first sensing electrodes arranged in rows and a plurality of second sensing electrodes arranged in columns, wherein two adjacent first sensing electrodes are mutually connected via a connection line and the second sensing electrodes are separated from each other.

18. The method for manufacturing the touch device as claimed in claim 17, further comprising
- forming an insulation layer on the connection line for electrically insulating the corresponding first sensing electrode and the second sensing electrode;
- forming a jumper on the insulation layer for electrically connecting correspondingly two adjacent second sensing electrodes; and
- forming, a signal transmitting wire on the second mask layer and on the extension portion of the sensing electrode layer, wherein the signal transmitting wire electrically, connects the extension portion of the sensing electrode layer.

19. The method for manufacturing the touch device as claimed in claim 18, wherein the jumper and the signal transmitting wire are formed at the same manufacturing process.

* * * * *